United States Patent
Gruszecki

(10) Patent No.: US 9,945,174 B2
(45) Date of Patent: Apr. 17, 2018

(54) ANCHOR FOR LAMINATED GLASS AND METHOD FOR SETTING OF THE ANCHOR IN LAMINATED GLASS

(71) Applicant: Jaroslaw Gruszecki, Domaslaw (PL)

(72) Inventor: Jaroslaw Gruszecki, Domaslaw (PL)

( * ) Notice: Subject to any disclaimer, the term of this patent is extended or adjusted under 35 U.S.C. 154(b) by 0 days.

(21) Appl. No.: 15/116,304

(22) PCT Filed: Feb. 5, 2014

(86) PCT No.: PCT/PL2014/050006
§ 371 (c)(1),
(2) Date: Aug. 3, 2016

(87) PCT Pub. No.: WO2015/119518
PCT Pub. Date: Aug. 13, 2015

(65) Prior Publication Data
US 2017/0009514 A1   Jan. 12, 2017

(51) Int. Cl.
*F16B 13/06* (2006.01)
*E06B 3/54* (2006.01)
*F16B 39/284* (2006.01)
*F16B 39/36* (2006.01)

(52) U.S. Cl.
CPC ............ *E06B 3/5436* (2013.01); *F16B 13/06* (2013.01); *F16B 39/284* (2013.01); *F16B 39/36* (2013.01)

(58) Field of Classification Search
CPC ...... F16B 13/00; F16B 13/06; F16B 13/0858; F16B 39/34; F16B 39/36; F16B 39/38; F16B 39/284; E06B 3/5436
USPC ........................ 411/44, 54, 54.1, 508; 16/2.1
See application file for complete search history.

(56) References Cited

U.S. PATENT DOCUMENTS

| | | | | |
|---|---|---|---|---|
| 4,702,654 A | * | 10/1987 | Frischmann | .......... F16B 13/004 411/31 |
| 4,761,860 A | * | 8/1988 | Krauss | ..................... A43C 5/00 24/713.6 |
| 5,076,746 A | * | 12/1991 | Fischer | ................. F16B 13/065 411/44 |
| 5,288,190 A | * | 2/1994 | Winkeljann | ............ F16B 13/00 411/55 |
| 5,911,550 A | | 6/1999 | Popp et al. | |
| 5,988,964 A | * | 11/1999 | Lins | .................... F16B 13/0858 411/30 |

(Continued)

FOREIGN PATENT DOCUMENTS

| | | |
|---|---|---|
| EP | 0336183 A2 | 10/1989 |
| GB | 2106209 A | 4/1983 |
| WO | 0192657 A1 | 12/2001 |

OTHER PUBLICATIONS

International Search Report, Application No. PCT/PL2014/050006, dated Jun. 16, 2014, 3 pages.

*Primary Examiner* — Roberta S Delisle
(74) *Attorney, Agent, or Firm* — Ziegler IP Law Group, LLC

(57) ABSTRACT

An anchor for laminated glass includes an expansion dowel that has expansion appendices situated circumferentially, and is preferably made of a flexible material and having a conical cross-section with thickness increasing in the direction of insertion. Above the line of the expansion appendices is a circumferential groove, situated at the height of the edge of transition of the cylindrical hole into the conical hole, forming an empty space.

12 Claims, 3 Drawing Sheets

(56) References Cited

U.S. PATENT DOCUMENTS

| | | | | |
|---|---|---|---|---|
| 6,213,697 B1* | 4/2001 | Uejima | ............... | F16B 13/004 411/30 |
| 6,796,091 B2* | 9/2004 | Elmer | ............... | E04F 13/145 403/388 |
| 7,150,595 B2* | 12/2006 | Liebig | ............... | F16B 13/066 411/60.3 |
| 7,357,613 B2* | 4/2008 | Houck | ............... | F16B 13/0858 411/57.1 |
| 8,192,122 B2* | 6/2012 | Gaudron | ............... | F16B 13/066 411/32 |

* cited by examiner

ANCHOR FOR LAMINATED GLASS AND METHOD FOR SETTING OF THE ANCHOR IN LAMINATED GLASS

BACKGROUND

The invention relates to an anchor for laminated glass and a method for its setting in laminated glass in an undercut hole. The anchor is intended for fixing in laminated glass, composed of at least two layers (for instance, a support layer and an external layer), and for glazing units composed of the aforementioned set constituting a support element, a glazing cavity and an external front plate. It will be evident and understandable for a person skilled in the art that the aforementioned anchor and method for its setting may be applied also in case of other materials.

Methods for setting of anchors in laminated glass are known in the art. One of these methods consists in setting of a countersunk cap even before the lamination process. Then, a set of two glass panels with the cap set between them is laminated in a furnace under negative pressure. The connected panels have a cap set, and the cap cannot be removed. The process has some disadvantages, because during lamination at higher temperatures, the cap settles asymmetrically and askew in relation to the surface of the panels. Moreover, stresses occur resulting from the presence of the countersunk cap during the lamination process.

Other known methods for setting of the anchor in laminated glass consist in setting of a countersunk anchor in the mass of the material, not in the space between the panels. In one of these methods, the anchor is set in a conical hole with an undercut in the glass panel's depth. It is an analogous method with that used in the case of anchors for stone. The hole is not made all the way through. Then, the anchor with a protruding threaded mandrel is installed in the hole using a special machine. In another variant of this method, the anchor is set in a prepared hole, but the gap formed between the anchor and the hole requires filling with a sealant. The sealant is fed via a special hole in the anchor's sleeve.

Methods for fixing of glass using a rotule fitting are also known, and they require making a through-hole, penetrating all layers of glass. In such case, the glass panels are fixed in a visible way. The fixations of rotule fittings may be set even with the surface of the exterior wall finish or as protruding. Another method consists in cementing of steel elements using silicones for glass.

From Polish patent description No. PL166087, a coupling is known, having a spacing element in the form of a two-way bent, oval metal ring. Its bent ends abut the conical surface of the coating of the spacing cone. The front panel is characterised in that the ring is pushed onto the spacing cone, and in the undercut, its external edge abuts the wall of the drilled hole.

From another Polish patent description No. PL202352, a system with a fixing element anchored in a plate composite casing is known. The fixing element anchored in an undercut hole has an expansion cone, onto which an expansion ring is pushed. In order to enable alignment of the shift between the layers of the composite casing, the hole in the external layer has a larger diameter than that in the next layer of the composite casing. Moreover, the washer of the fixing element has an injection hole that enables filling the space between the threaded mandrel of the fixing element and the wall of the hole in the external layer of the composite casing with a sealant. A disadvantage of this solution consists in the fact that it requires using a sealant, and the anchor protrudes beyond the surface of the material.

From German paten application No. DE102009044770, an anchor set in laminated glass in a conical hole with an undercut is known. Such setting of the anchor requires making a hole in the depth of one glass panel and a through-hole in the other panel. The anchor is set using an expansion element for a countersunk cap with two sealing layers which may shift in relation to one another. A disadvantage of this solution consists in the fact that it requires using washers.

Next, in European patent No. EP1660737, a fixing device is disclosed for creation of anchorage in panels made of monolithic glass. It requires using a cover made of a flexible material and a hardenable mix on the mandrel.

SUMMARY

The aim of the invention was to develop a solution eliminating existing disadvantages of known solutions in the form of a necessity to make holes in all panels of laminated glass, and use sealants and washers, as well as protrusion of a part of the anchor beyond the panels surface. This goal was achieved thanks to setting of the anchor in a conical undercut made only in one panel, and using a structure of anchoring appendices that contact with the conical hole on the cone's surface, and not —as in hitherto known solutions —in the place where the cylindrical hole turns into the conical hole.

The anchor for laminated glass according to the invention, is set in a blind cylindrical hole with a conical undercut in the laminated plate, consisting of at least two panels, one of which is a support panel with a cylindrical through-hole with a conical undercut abutting the second, external glass panel. The anchor has a countersunk cap, on which a dowel with an expansion anchoring element is placed. The anchor is characterised in that the expansion dowel is equipped with expansion appendices situated on its circumference, made preferably of a flexible material and having a conical cross-section with thickness increasing in the direction of insertion. On the other hand, there is a circumferential groove above the line of the expansion appendices, the groove being situated at the height of transition of the cylindrical hole into the conical hole, and forming an empty space.

Preferably, between the conical frontal surface of the expansion cap with compressed expansion dowel and the bottom surface of the hole, empty space is located.

Preferably, between the expansion dowel and the surface of the hole, a plastic cover is placed, reducing point stress, while the diameter of the expansion cap is larger than the diameter of the expansion dowel.

Preferably, diameters of the expansion cap and the expansion dowel are the same.

Preferably, the surface of the expansion appendices is covered with a plastic having a high friction coefficient, preferably nylon or EPDM or polyolefins.

Preferably, the angle $\alpha$ of the cap's cone is in the range of 110-150°.

Preferably, the angle $\beta$ between the external surface of the cap's cone and the internal surface of the expansion dowel's appendices is in the range of 0-30°.

Preferably, the angle $\gamma$ between the internal surface and the external surface of the expansion dowel's appendices is in the range of 0-20°.

The method for setting of the anchor in laminated glass according to the invention, the glass consisting of at least two panels, one of which preferably is a support panel, and the other, external one—a glass panel, consists in setting of the anchor in an undercut hole made in the support panel, which is laminated with the external glass panel so as to the conical undercut of the hole abuts the other glass panel. The method is characterised in that in the hole of the support panel, a countersunk expansion cap is placed, and a dowel with expansion appendices is put onto it. The expansion appendices are situated on the circumference of the expansion dowel, made preferably of a flexible material and having a conical cross-section with thickness increasing in the direction of insertion. Then, the dowel is deformed so as to the expansion appendices, in the result of compressive forces, contact the conical hole on the cone's surface, beyond the edge connecting the conical surface with the cylindrical surface of the hole, increasing the diameter of the hole. On the other hand, surfaces of the cap and the expansion dowel are located at the same level and in one plane, and the circumferential groove situated above the line of the expansion appendices, is located at the height of the edge of transition of the cylindrical hole into the conical hole, forming an empty space.

Preferably, an empty space forms between the conical frontal surface of the expansion cap with the compressed dowel and the bottom surface of the hole.

Preferably, the conical part of the hole is made at an angle of from 40° to 50° in relation to the surface of the support panel.

Thanks to application of an anchor design placed in an undercut hole according to the invention, the anchor does not protrude above the surface of the panels. A shift between the panels during lamination does not affect the shape of the hole and subsequent setting of the anchor. The appendices of the anchoring dowel made in a special way contact the conical hole on the surface of the conical hole linearly, and not on the edge in the place where the cylindrical hole turns into the conical one. Moreover, the appendices of the expansion dowel, having a conical shape of their cross-section, protect the cap from slipping, as the cap locks in the hole, increasing the diameter of the whole anchor. In this way, operation of the anchor consists in transmission of forces onto the material by compression, and not cutting the appendices off.

DESCRIPTION OF THE DRAWINGS

The subject of the invention is illustrated as an embodiment in the drawing, where.

DESCRIPTION OF DISCLOSED EMBODIMENTS

Figure 1:
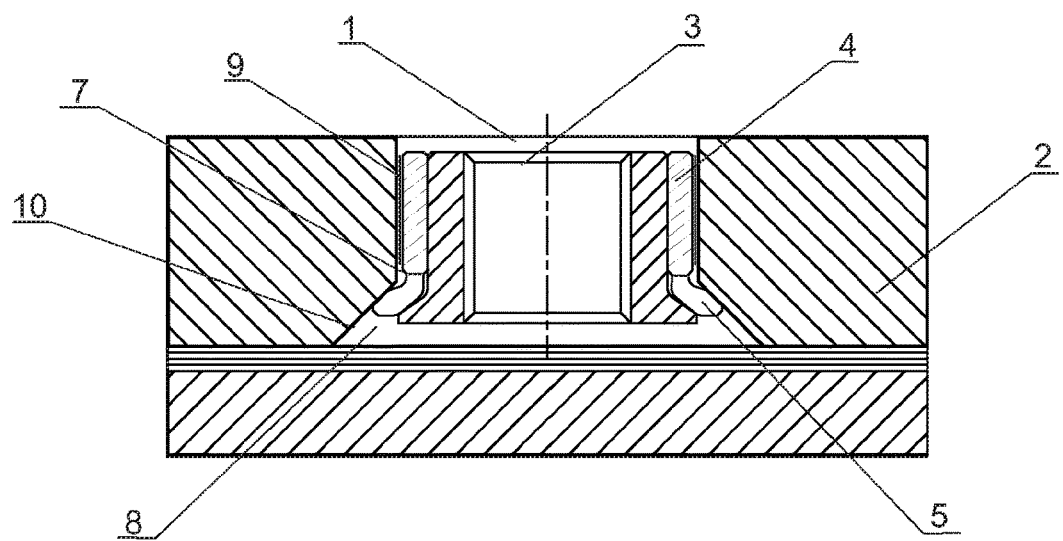
FIG. 1 shows a cross-section of the anchor set in a two-layer plate of laminated glass.
Figure 2:
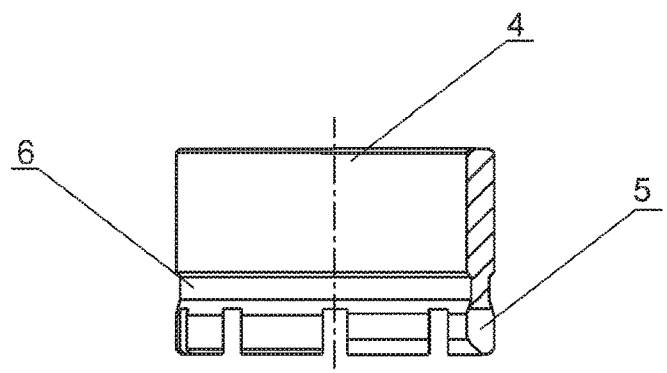
FIG. 2—a dowel with expansion appendices.
Figure 3:
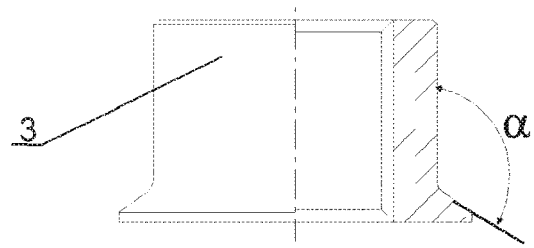
FIG. 3—an expansion cap.
Figure 4:
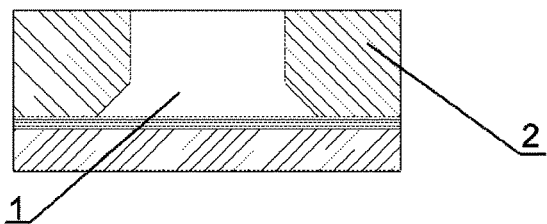
FIGS. 4-8—the method for setting of the anchor in an undercut hole.
Figure 5:
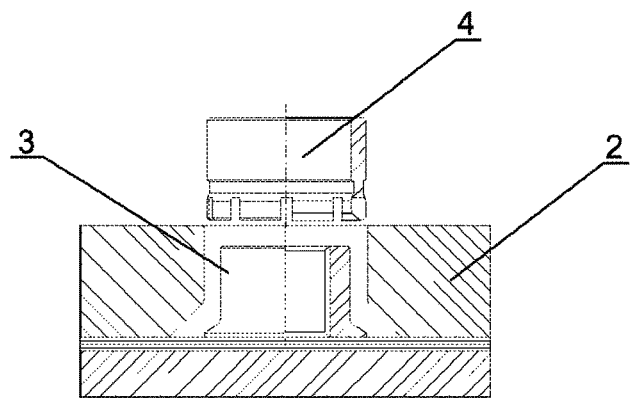
Figure 6:
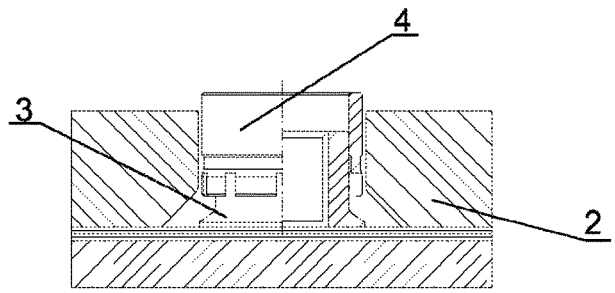
Figure 7:
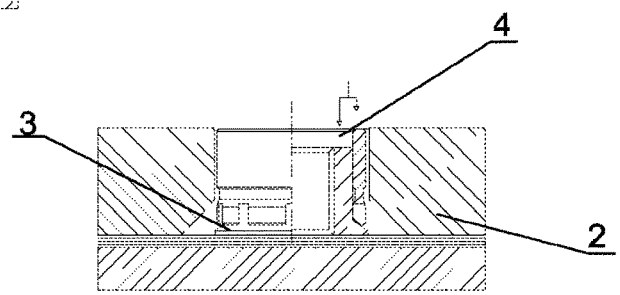
Figure 8:
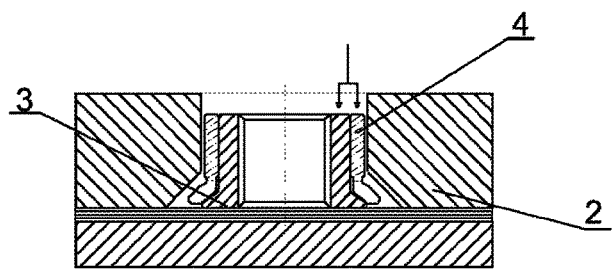
Figure 9:
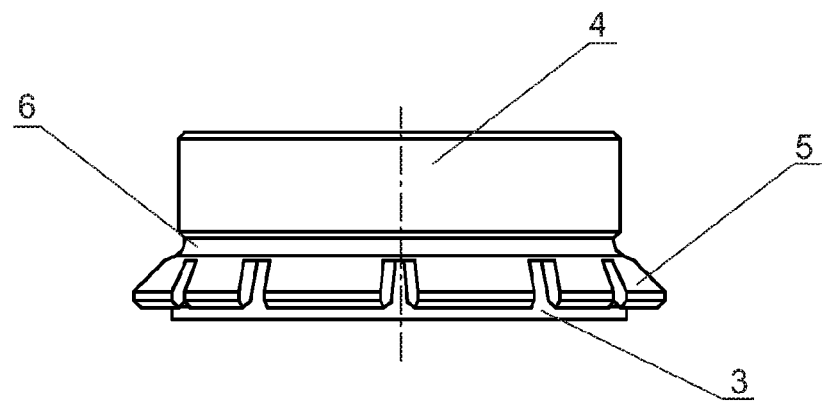
FIG. 9—a part of the dowel in the form of expansion appendices with a circumferential groove.
Figure 10:
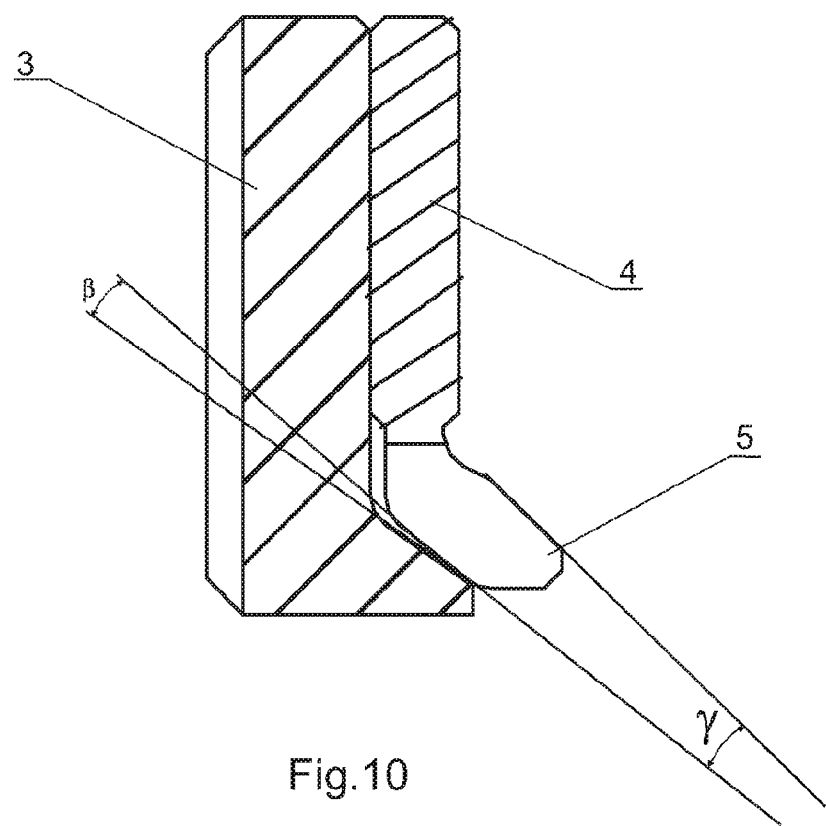
FIG. 10—deformation of the appendices on a cap.

In one of embodiments of the invention, a circular anchor is set in a two-layered glass panel in a cylindrical hole 1 with a conical undercut 10.

In order to set the anchor, at first, the hole 1 with a conical undercut 10 is made in the support panel 2, which is drilled all the way through. The conical part of the hole is made at an angle of from 45° in relation to the surface of the support panel. The glass panels are laminated together so as to the broadened conical part 10 of the hole 1 is connected by the laminate with the second glass panel. A shift between the panels during lamination does not affect the shape of the hole, and subsequent setting of the anchor. Connected and laminated panels form together the blind hole 1 with a conical undercut 10, in which the anchor is set.

The anchor consists of a countersunk expansion cap 3 and an expansion dowel 4. The angle α of the cap's cone is equal to 130°. Then, a screw is driven in into the thread of the cap 3 in order to fix the whole structure. The dowel 4 has twelve expansion appendices 5 made of a flexible material and having a conical cross-section with thickness increasing in the direction of insertion. There is a circumferential groove 6 above the line of the expansion appendices 5, the groove being situated at the height of transition of the cylindrical hole 1 into a conical hole 10. The surface of the expansion appendices 5 is covered with a plastic having a high friction coefficient, selected from the group comprising nylon, EPDM and polyolefins. The diameters of the cap 3 and the dowel 4 have the same size. On the other hand, in another embodiment of the invention, a cover 9 made of a plastic reducing point stress is placed between the hole 1 and the anchor, but then, the diameter of the expansion cap 3 is larger than the diameter of the expansion dowel 4.

Then, a countersunk expansion cap 3 is placed in the hole 1 of the support panel 2. Onto the cap 3, the dowel 4 with the expansion appendices 5 is put and the dowel 4 is deformed so as to the expansion appendices 5 in the result of compressive forces contact the conical hole 10 on the cone's surface, beyond the edge connecting the conical surface with the cylindrical surface of the hole 1, leading to an increase of the diameter of the hole 1. Surfaces of the cap 3 and the expansion dowel 4 are located at the same level and in one plane, and the circumferential groove 6 situated above the line of the expansion appendices 5, is located at the height of the edge of transition of the cylindrical hole 1 into the conical hole 10, forming an empty space 7 in-between. In case when the deformation is carried out properly, surfaces of the cap 3 and the dowel 4 are located at the same level. At the same time, an empty space 8 is formed between the conical frontal surface of the expansion cap 3 with the compressed expansion dowel 4 and the bottom surface of the hole 11.

The angle β between the external surface of the cap's cone 3 and the internal surface of the appendices 5 of the expansion dowel 4 is in the range of 0-30°. The obtained difference between the angles is filled with the appendices 5 of the expansion dowel 6. It leaves much more space for deformation of the appendices 5 of the dowel 6 and lower setting of the anchor. Then, the angle □ between the internal surface and the external surface of the appendices 5 of the expansion dowel 4 is in the range of 0-20°. After deformation, the appendices 5 form contact with the material beyond the bend edge between the cylindrical 10 and conical part of the hole 1. Conical shape of the appendices 5 is intended for protection of the cap 3 from sliding off, as a result the cap 3 locks itself in the hole 1, increasing the diameter of the whole anchor. In this way, operation of the anchor consists in transmission of forces onto the material by compression, and not cutting the appendices off.

What is claimed is:

1. An anchoring system for laminated glass, the anchoring system comprising an anchor and a laminated panel, the anchor configured to be set in a cylindrical undercut hole in the laminated panel, the cylindrical undercut hole having a cylindrical portion and a conical undercut, the laminated panel comprising at least two panels, a support panel and an external glass panel, the support panel with the cylindrical undercut hole with the conical undercut abutting the second external glass panel, the anchor having a countersunk expansion cap, onto which an expansion dowel with an expansion anchoring part is placed for setting in the cylindrical undercut hole, wherein the expansion dowel has expansion appendices situated circumferentially, the expansion appendices comprising a flexible material and a conical cross-section with a thickness increasing in a direction of insertion, a circumferential groove being disposed above a line of the expansion appendices, the circumferential groove being situated at a height of an edge of a transition of the cylindrical portion of the cylindrical undercut hole into the conical undercut, an empty space being formed between the cylindrical portion and the conical undercut.

2. The anchoring system according to claim 1, comprising another empty space between a conical frontal surface of the countersunk expansion cap with a compressed expansion dowel and a bottom surface of the undercut.

3. The anchoring system according to claim 1, comprising a plastic cover between the expansion dowel and a surface of the cylindrical undercut hole, the plastic cover being configured to reduce point stress, a diameter of the countersunk expansion cap being larger than a diameter of the expansion dowel.

4. The anchoring system according to claim 1, wherein a diameter of the countersunk expansion cap and a diameter of the expansion dowel are the same.

5. The anchoring system according to claim 1, wherein a surface of the expansion appendices is covered with a plastic having a high friction coefficient, the plastic comprising one or more of a nylon, EPDM or polyolefins.

6. The anchoring system according to claim 1, wherein an angle α of a cone of the countersunk expansion cap is in a range of 110-150°.

7. The anchoring system according to claim 1, wherein an angle β between an external surface of a cone of the countersunk expansion cap and an internal surface of the expansion appendices of the expansion dowel is in a range of 0-30°.

8. The anchoring system according to claim 1, wherein an angle γ between an internal surface of the expansion appendices and an external surface of the expansion appendices of the expansion dowel is in a range of 0-20°.

9. A method for setting of an anchor in laminated glass, the laminated glass comprising at least, a support panel and an external glass panel, the method comprising:
setting the anchor in a cylindrical undercut hole made in the support panel, the cylindrical undercut hole comprising a cylindrical portion and an conical undercut portion,
laminating the support panel with the external glass panel so the conical undercut portion of the cylindrical undercut hole abuts the external glass panel,
disposing a countersunk expansion cap in the cylindrical undercut hole of the support panel;
disposing a dowel on the countersunk expansion cap, the dowel having expansion appendices situated on a circumference of the dowel, the expansion appendices comprising a flexible material and having a conical cross-section with a thickness increasing in a direction of insertion,
deforming the dowel so the expansion appendices, as a result of compressive forces, contact a surface of the conical undercut portion of the cylindrical undercut hole on, beyond an edge connecting a conical surface of the conical undercut portion with a cylindrical surface of the cylindrical portion of the cylindrical undercut hole and increasing a diameter of the cylindriucal undercut hole, wherein surfaces of the countersunk expansion cap and the expansion dowel are located at a same level and in one plane, while a circumferential groove situated above a line of the expansion appendices is located at a height of a transition of the cylindrical portion of the cylindrical undercut hole into the conical undercut portion, and forming an empty space between the cylindrical portion and the conical undercut portion.

10. A method according to claim 9, wherein deforming the dowel further comprises forming another empty space between a conical frontal surface of the expansion cap with a compressed dowel and a bottom surface of the cylindrical undercut hole.

11. A method according to claim 9, wherein a conical part of the conical undercut hole is disposed at an angle of from 40° to 50° in relation to a surface of the support panel.

12. An anchoring system for laminated glass, the anchoring system comprising an anchor and a laminated panel at least a support panel and an external glass panel, the anchor configured to be set in a cylindrical undercut hole in the laminated panel, the cylindrical undercut hole having a cylindrical portion and a conical undercut portion, the support panel with the cylindrical undercut hole with the conical undercut abutting the second external glass panel, the anchor having a countersunk expansion cap, onto which an expansion dowel with an expansion anchoring part is placed for setting in the cylindrical undercut hole, wherein the expansion dowel has expansion appendices situated circumferentially, the expansion appendices comprising a flexible material and a conical cross-section with a thickness increasing in a direction of insertion, a circumferential groove is disposed above a line of the expansion appendices, the circumferential groove being situated at a height of an edge of a transition of the cylindrical portion of the cylindrical undercut hole and the conical undercut portion, an empty space being formed between the cylindrical portion and the conical undercut; and a plastic cover between the expansion dowel and a surface of the cylindrical undercut hole, the plastic cover being configured to reduce point stress, wherein a diameter of the countersunk expansion cap is larger than a diameter of the expansion dowel.

* * * * *